United States Patent [19]

Markovs

[11] Patent Number: 4,874,525

[45] Date of Patent: Oct. 17, 1989

[54] PURIFICATION OF FLUID STREAMS CONTAINING MERCURY

[75] Inventor: John Markovs, Yorktown Heights, N.Y.

[73] Assignee: UOP, Des Plaines, Ill.

[21] Appl. No.: 262,830

[22] Filed: Oct. 26, 1988

[51] Int. Cl.[4] .................. B01D 15/00; B01D 53/04
[52] U.S. Cl. .......................... 210/673; 55/31; 55/72; 210/678; 210/679; 210/688; 210/689; 423/107; 423/210
[58] Field of Search .............. 55/31, 72; 208/253; 210/673, 679, 688, 689, 678; 423/107, 210

[56] References Cited

U.S. PATENT DOCUMENTS

| | | | |
|---|---|---|---|
| 3,193,987 | 7/1965 | Manes et al. | 55/72 |
| 3,257,776 | 6/1966 | Park et al. | 55/72 |
| 4,101,631 | 7/1978 | Ambrosini et al. | 423/210 |
| 4,709,118 | 11/1987 | Yan | 208/253 |

OTHER PUBLICATIONS

Barrer et al., "Mercury Uptake in Various Cation Forms of Several Zeolites", J. Chem. Soc. (1967) pp. 19–25.

*Primary Examiner*—Ivars Cintins
*Attorney, Agent, or Firm*—Thomas K. McBride

[57] ABSTRACT

Mercury is selectively removed to very low levels of concentration from fluid streams such as natural gas, cracked gas, hydrogen or naphtha by passage of the stream through an adsorbent bed containing particles of a zeolitic molecular sieve having pore diameters of at least 3.0 Angstroms and in which the zeolite crystallites forming the outer shell of the adsorbent particle to a depth of not greater than about 0.1 millimeter into the adsorbent particle, contain ionic or elemental silver. These adsorbent particles are utilized to particular advantage in a compound adsorbent bed containing a desiccant substantially free of silver through which a fluid stream containing both mercury vapor and water vapor is both dried and purified with respect to mercury by passage therethrough, coupled with periodic regeneration of both media using conventional purge desorption methods.

10 Claims, 2 Drawing Sheets

PURIFICATION OF FLUID STREAMS CONTAINING MERCURY

FIELD OF THE INVENTION

The present invention relates to the purification of fluid streams and more particularly to the removal of mercury vapor from gas streams such as natural gas, hydrogen or cracked gas by means of adsorbing the mercury, and optionally other impurity constituents of the fluid stream, by passage through a bed of adsorbent particles having an outer coating or shell of a zeolite having pores of at least 3.0 Angstroms, said zeolite containing either ionic or elemental silver on its surface or in its pore system to a depth of no more than about 0.1 millimeter, said adsorbent particles being otherwise substantially free of ionic or elemental silver.

THE PRIOR ART

Mercury vapor is an undesirable constituent of a considerable number of gas streams, and consequently a considerable number of methods have been devised to selectively remove mercury vapor. In U.S. Pat. No. 4,729,882 (Ide et al.) the mercury vapor is converted by a chlorine-containing material into water-soluble mercuric chloride which is removed from the gas stream by water-washing.

In U.S. Pat. No. 4,693,731 (Tarakad et al.) the mercury vapor in the gas stream to be purified is contacted with a mercury-free hydrocarbon liquid in which the mercury vapor is dissolved and removed from the contact zone along with the hydrocarbon liquid.

An adsorbent formed by the reaction of a polysulfide solution with a strongly basic anion-exchange resin is taught to be a material useful in removing mercury from natural gas streams in U.S. Pat. No. 4,591,490 (Horton). Sodium (pseudo-) tetrasulfide is stated to be a preferred reagent for that purpose.

By far the most common type of adsorbent composition for use in selectively adsorbing mercury vapor from gas streams is an activated carbon having supported thereon a mercury reactive material such as potassium triiodide, sulfur, sulfuric acid, chlorine, silver, copper or various salts of silver or copper. See in this regard the disclosure of Nishino (U.S. Pat. No. 4,500,327) and de Jong et al (U.S. Pat. No. 4,196,173).

It is also well-known in the art to utilize other supports for mercury reactive materials in mercury purification processes. These supports include silicas, aluminas, silica-aluminas and aluminosilicates, the latter class of materials including the so-called zeolite molecular sieves. As reported in a literature article by R. M. Barrer et al in "J. Chem. Soc., Sect. A, Part I, pgs. 19–25 (1967), zeolites, particularly those having the faujasite type of crystal structure such as zeolite X, in the sodium, lead, mercury and silver ion-exchanged forms, have been investigated for their ability to sorb mercury vapor. A highly exchanged Ag X zeolite was found to copiously adsorb mercury vapor in two stages, namely an initial stage in which zeolitic $Ag^+$ cations were reduced to elemental Ag, and a subsequent stage involving, in part, the clustering of mercury atoms around silver atoms, and in part, further reduction of $Ag^+$ and $Hg^{++}$ ions, the latter to $Hg_2^{++}$. Other zeolites investigated including the silver-exchanged forms of zeolite A, gmelenite and chabazite, while effective in sorbing mercury, were less so than AgX.

While the usefulness of silver exchanged zeolites, especially AgX, has heretofore been established, there remains a significant economic disadvantage in its use—namely the high cost of silver. For example, assuming a silver cost of about $6.75 per troy ounce, the cost of providing an effective quantity of moderately exchanged silver zeolite X (about 69 equivalent percent exchange) for a single mercury removal stage of a typical LNG pretreatment process would be about $300,000 (U.S. dollars). Stated in different terms, a 69% silver exchanged zeolite X contains (anhydrous bonded zeolite basis) about 29.2 weight percent silver, or a silver cost of about $63.00 per kilogram of adsorbent. On a commercial scale, such costs are very significant.

THE PRESENT INVENTION

It has now been found that the costs of using silver-exchanged zeolites for the selective removal of mercury from fluid streams can be greatly reduced without a corresponding reduction in the effectiveness of the process. This cost reduction is based on the discovery that the effectiveness of the silver constituent of the zeolite on the outer portion of the adsorbent particle is many times greater than silver values located more deeply into the particle. In view of the small atomic diameter of mercury compared with the pore diameters of most zeolites and the much larger macropores of zeolite agglomerates, it is quite unexpected that the adsorbed mercury atoms appear to penetrate the zeolite mass only with considerable difficulty under the conditions ordinarily employed in the purification of fluid streams. While the reasons for the observed phenomena are not fully understood, it is possible that the reduction of zeolitic silver anions to metallic silver coupled with the subsequent formation of mercury-silver amalgam particles within the pore system and/or the outer surface of the zeolite crystallites blocks the available pores which permit access to the internal portions of the zeolite adsorbent agglomerates. In any event, the silver ions or metallic silver located within about 0.1 millimeter of the outer edge of the surface of the adsorbent particle are found to be essentially fully utilized in the chemisorption of mercury vapor from fluid streams containing mercury which are passed over the adsorbent particles. It is further found that when such silver-containing particles are utilized in a compound bed also containing a sorbent for some other constituent of the fluid stream which is desired to be removed, such as water, purge desorption of both of the adsorbents can be effected at the same time. In the compound bed the two types of adsorbent particles can be maintained in discrete zones, or can be intermixed.

THE DRAWINGS

FIG. 1 of the drawings is a representation of a single composite fixed adsorbent bed containing a zone of a desiccant zeolite and a zone of a silver zeolite for selectively adsorbing mercury in the vapor phase. The drawing shows the same bed in the adsorption mode and in the regeneration mode.

FIG. 2 of the drawings is a representation of a pair of fixed adsorbent beds containing only the AgX zeolite which forms one zone of the beds in FIG. 1, and utilized in the liquid phase adsorption of mercury.

DETAILED DESCRIPTION OF THE INVENTION

Figure 1:
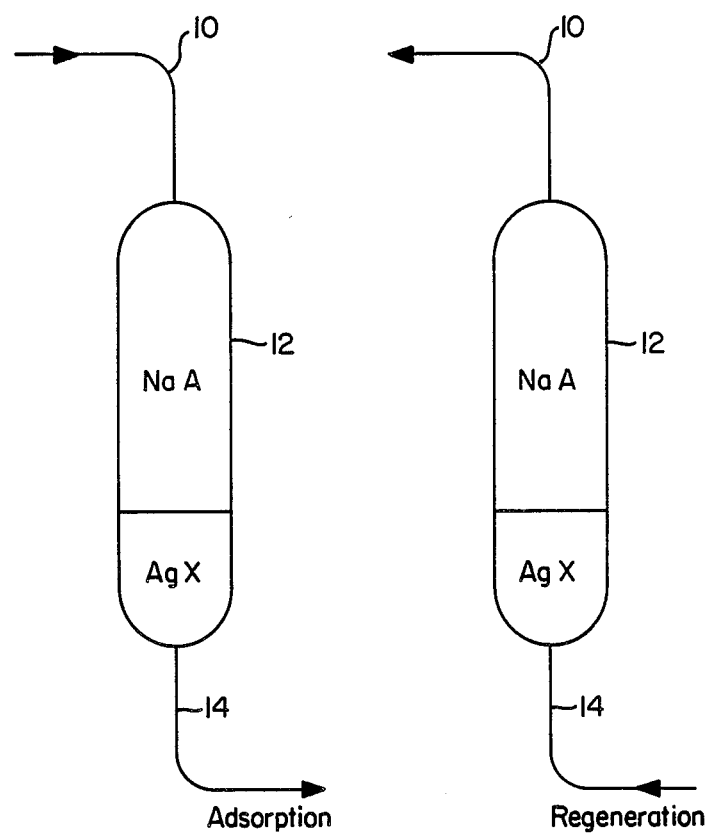

In carrying out the process of the present invention, it is necessary only to utilize a zeolitic adsorbent in which the major proportion, preferably essentially all, of the silver ions or atoms are readily available to mercury atoms of the fluid stream being treated. Such particles are comprised of crystallites of a zeolitic molecular sieve having pore diameters of at least 3.0 Angstroms and in which the said zeolite crystallites forming the outer shell of the adsorbent particles to a depth of not greater than about 0.1 millimeter, preferably not greater than 0.05 millimeter, into the particles and constituting less than 35 volume percent, preferably less than 25 volume percent, of said particles contain ionic or elemental silver, the remainder of the overall adsorbent particles being essentially free of silver. The adsorbent particle normally has a nominal diameter of from about 1.6 to 6.4 millimeters if the particle is spherical, cylindrical, or generally spherical or cylindrical, in configuration, and a length of about 3.0 to 10 millimeters if cylindrical or generally cylindrical. By nominal diameter is meant the diameter of an annular ring through which the particle will closely pass in a direction perpendicular to the plane of it smallest dimension. Thus, for example, the adsorbent particle may comprise crystallites of a zeolite which have been bonded to a non-zeolitic inner core such as a glass bead or other dense phase material. Such a particle can then be subjected to any degree of intensity of ion-exchange with silver ions whereby the zeolite crystallites which form the outer shell of the particle can be converted fully to the silver cation form or to any desired lesser degree merely by control of the silver content of the ion-exchange medium.

Alternatively, a conventional zeolite adsorbent particle either self-bonded or bonded with silica, alumina, clay and the like, and in the form of a bead or a pellet or particle derived from large agglomerates by crushing and sieving can be subjected to a controlled i.e. limited, contact with a silver-containing ion-exchange solution whereby the silver ions exchanged into the zeolite are at zeolitic cation sites most readily available. By limiting the contact period and the quantity of silver ions in the ion-exchange medium, diffusion and equilibration of the silver ions throughout the entire zeolite particle can be inhibited so that the large majority of zeolite silver ions are in the outer shell of the adsorbent particle.

Since the chemisorption of mercury atoms on silver cations forms of zeolites can occur in part by the clustering of mercury atoms around silver atoms rather than the reduction of $Ag^+$ ions in accordance with following equations:

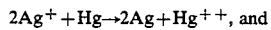
$2Ag^+ + Hg \rightarrow 2Ag + Hg^{++}$, and

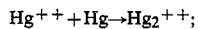
$Hg^{++} + Hg \rightarrow Hg_2^{++}$;

it is possible to incorporate elemental silver into the zeolite pore system by means other than by direct ion-exchange of silver ions into the zeolite to provide an adsorbent suitable for use in the present invention. For such purpose an aqueous solution of a silver amine complex is used to ion-exchange with the zeolitic metal cations, and the resulting complex cations are reduced to very finely divided elemental silver by chemical or thermal treatment. Another technique is the adsorption by the zeolite of a fluid decomposable compound of silver, such as silver carbonyl, coupled with either chemical or thermal reduction of the adsorbed silver compound. Such techniques are disclosed in U.S. Pat. No. 3,200,083 (R. M. Milton). Because, however, the reduction of silver zeolitic cations is the principal mechanism whereby the initially contacted mercury atom are chemisorbed, it is preferred that the zeolite adsorbent be prepared, at least in part, by direct ion-exchange with $Ag^+$ ions.

The specific zeolite employed is not narrowly critical, it being necessary only that it have pores large enough to permit entry of mercury atoms and large enough to be converted to the silver cation form or be impregnated with decomposable metallic precursor complexes. That is not to say, however, that all zeolites perform with the same degree of effectiveness. In general, large pore zeolites and/or those which have relatively large internal cavities such as zeolite X and zeolite A, are preferred. For reasons not fully understood, zeolites having the faujasite structure, i.e. zeolite X and zeolite Y, are found to be superior sorbents in the present process and are particularly preferred.

The number of silver cations or the amount of elemental silver contained by the zeolite crystallites in the outer shell of the adsorbent particles is not critical. In view of the fact, however, that the capacity of the adsorbent for mercury is in direct proportion to the available silver, it is advantageous to have at least 70b equivalent percent of the zeolitic cation sites occupied by $Ag^+$ cations or an equivalent amount of elemental silver deposited in the pore system of the zeolite.

The feedstocks suitably treated for the removal of mercury in accordance with the present invention are also not critical and include essentially any industrial or refinery stream contaminated with mercury and having a chemical composition which is not destructive toward the zeolite support, i.e. is relatively free of strong acids or bases. These include natural gas, hydrogen gas from an electrolytic or chlor-alkali plant, helium and other inert gases, furnace stack gases, battery disposal incinerator gases, air, hydrocarbons such as ethylene (cracked gas), light and heavy naphtha fractions, liquefied petroleum gas, dripolene and the like. The feedstocks are suitably processed by the present process either in the gaseous or the liquid phase, preferably in the temperature range of 0° C. to 50° C. and using pressures of from atmospheric to 2000 psia.

Because the chemisorbed mercury impurity is located at the outer regions of the adsorbent particles in the present process, it does not encounter the problem of tortuous diffusion through the much longer micropore and macropore system of prior proposed silver zeolite adsorbents. Thus the present process has the particular advantage in the drying and mercury purification of natural gas streams using compound fixed beds containing specific adsorbents for water vapor and mercury vapor. It has been found that the regeneration of the water adsorbent is also effective for the regeneration of the mercury adsorbent. In processes for the liquifaction of mercury-containing natural gas streams it is known that the mercury, unless removed, causes corrosion in the cryogenic heat exchangers resulting in plant shutdowns and very expensive repairs. Accordingly in a baseload LNG plant a typical processing scheme of the prior art involved the steps of (a) carbon dioxide removal, (b) water removal, and (c) liquifaction, with mercury removal being accomplished in a fixed adsorbent bed containing a special adsorbent for that purpose either just prior to the carbon dioxide removal or just after the drying step and before the liquifaction. This mercury adsorbent bed was non-regenerative, i.e. the natural gas was passed continuously through the adsorbent mass until the degree of mercury removal became inadequate, and then the special mercury adsorbent was replaced by a fresh charge. It is to be noted that a non-regenerative bed has a number of additional disadvantages. For instance, any liquids that were accidentally carried into the bed were slow to leave since they were vaporized only by the purging action of the feedstock, and once the macropore system of the bed was filled with liquid, the rate of mass transfer was greatly decreased. Further, with the gas flow always in the same direction through the bed, solid and liquid entrainment tended to accumulate in the same areas of the bed, with resultant channeling and premature leakage of mercury from the bed.

In accordance with the present invention, a composite fixed bed is employed, preferably having a discrete zone containing a conventional desiccant, such as zeolite 4A, and a zone occupied by the silver-containing zeolite mercury adsorbent. Advantageously the natural gas stream to be dried and purified of mercury is passed through the bed in a manner to first contact the desiccant zone and then through the zone containing the mercury adsorbent. Prior to the breakthrough of either the water or the mercury mass transfer zone, the flow through the bed is terminated and the bed is regenerated using a stream of heated non-sorbable purge gas. Flow during regeneration can be either cocurrent or countercurrent with respect to the direction of flow during the adsorption stage.

The aforesaid process is illustrated with reference to the figures of the drawings. In FIG. 1 of the drawings, composite bed 12 contains 49,000 pounds of ⅛" extruded zeolite 4A pellets in the upper zone and in the lower zone 7,970 pounds of ⅛" extruded zeolite X pellets having 13.6 weight percent silver as zeolite cations, 95 percent of which are located within 0.1 millimeter of the external surface of the pellets. Natural gas from which the $CO_2$ has previously been removed, containing 649 ppm(v) water vapor and 14 parts per billion [ppb(v)] mercury vapor is passed into bed 12 through line 10 at a superficial space velocity of 35.3 feet per minute and at a temperature of 21° C. Water is adsorbed on the 4A zeolite and the dried natural gas containing mercury vapor then passes through the zone containing AgX zeolite as described above, whereby the mercury content is reduced to less than 10 parts per trillion [ppt(v)] and the purified natural gas product is recovered from line 14. Prior to breakthrough of either the water or the mercury front, the adsorption purification stage is terminated and the bed is regenerated by passing a portion of the purified product natural gas through line 14 countercurrently through the bed at a temperature of 315° C. The desorbed water and mercury are recovered through line 10. After removal of the bulk of the water from the effluent stream by chilling to 50° C., the residual mercury-containing purge gas stream effluent can be burned as fuel, or further processed for the bulk removal of mercury.

Figure 2:
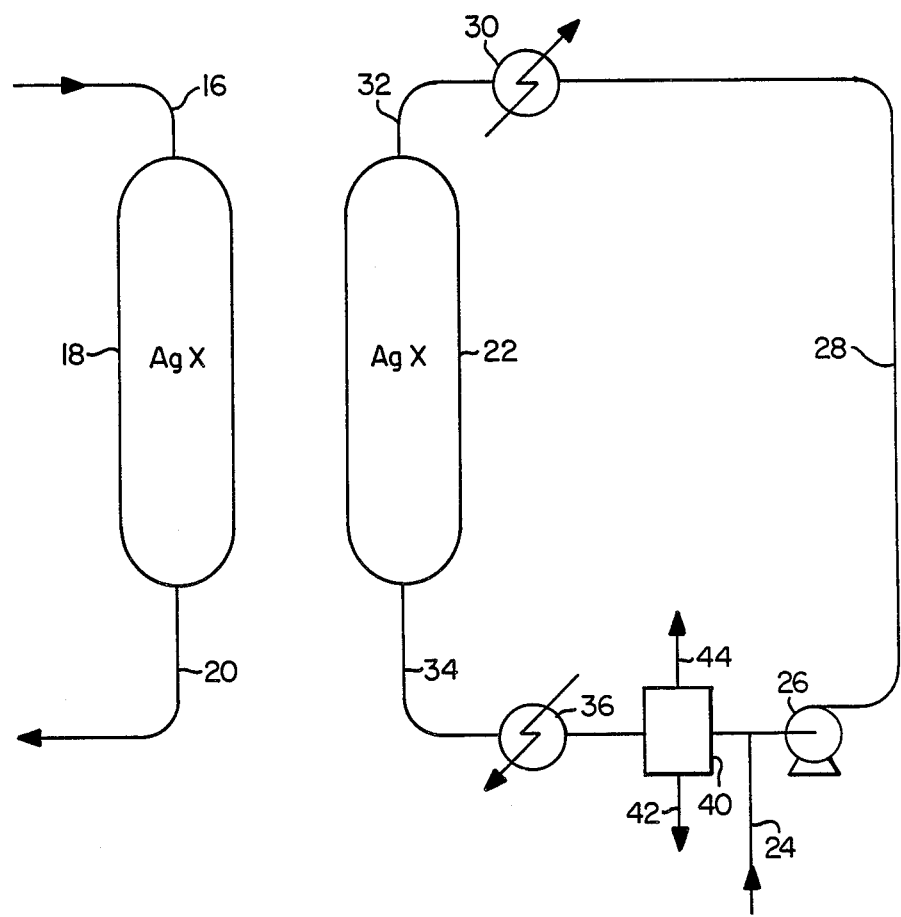

With respect to FIG. 2, a liquid hydrocarbon stream, such as naphtha, containing mercury as an impurity and intended for use in the preparation of cracked gas (ethylene) is fed in the liquid phase through line 16 into bed 18 containing the same AgX adsorbent as described above with respect to FIG. 1. The purified product stream is recovered as an effluent from the bed through line 20. During the adsorption purification procedure in bed 18, bed 22, which is essentially the same bed 18, is undergoing a regeneration procedure following use in purifying a prior portion of the feedstock being treated in bed 18. Bed 22 is regenerated in the vapor phase using a portion of the purified product from bed 18 and is fed into the system through line 24. The liquid phase hydrocarbon is passed via pump 26 and line 28 to vaporizer 30, and the heated vapor then passed through line 32 into bed 22. The hydrocarbon vapor purge stream carrying desorbed mercury passes out of bed 22 through line 34 and into condenser 36 wherein the mercury and the hydrocarbon purge stream is condensed, except for any small amount of non-condensables which may be present. The effluent from condenser 36 passes through line 38 into separator 40 wherein liquid mercury is withdrawn through line 42 and any non-condensable hydrocarbon vapor is vented through line 44. The liquid phase hydrocarbon is recycled through line 46 until regeneration of bed 22 is completed.

The liquid phase treatment of mercury-contaminated streams illustrated above in conjunction with FIG. 2 whereby the recovery of mercury is accomplished in the liquid phase has not heretofore been proposed in the prior art, and is applicable to mercury adsorbent generally, not only to silver supported on zeolites.

It will be understood that the foregoing illustrations are not intended to be limitational, and that many obvious embodiments of the invention as expressly disclosed will be readily apparent to those skilled in the art. Such embodiments are included within the invention as set forth in the appended claims.

What is claimed is:

1. Process for the removal of mercury vapor from a fluid stream which comprises passing said stream through an adsorbent bed containing particles comprised of crystallites of a zeolitic molecular sieve having pore diameters of at least 3.0 Angstroms and in which the said zeolite crystallites forming the outer shell of the adsorbent particles to a depth of not greater than about 0.1 millimeter into the particles and constituting less than about 35 volume percent of said particles, contain ionic or elemental silver, the remainder of the overall adsorbent particles being essentially free of silver, whereby at least a major proportion of said mercury is adsorbed and a purified effluent fluid stream is recovered.

2. Process according to claim 1 wherein the zeolite crystallites of the adsorbent particles containing silver comprise zeolite X or zeolite Y or zeolite A.

3. Process according to claim 2 wherein the fluid stream being treated for mercury removal is a hydrocarbon.

4. Process according to claim 3 wherein the fluid stream is natural gas containing both water vapor and mercury as impurity constituents and both impurities are removed by passage of the stream through a compound bed containing a desiccant adsorbent and said silver-containing adsorbent, and thereafter regenerating both adsorbent materials by passage through said compound bed of a non-sorbable purge gas at a temperature higher than employed during the adsorption stage.

5. Process according to claim 4 wherein the silver-containing adsorbent is contained within a discrete zone of the compound bed.

6. Process according to claim 3 wherein the hydrocarbon stream is treated in the liquid phase.

7. Process according to claim 6 wherein the fluid stream is naphtha.

8. Process for removing mercury from a feedstock fluid stream containing said mercury which comprises (a) passing said stream in the liquid phase through an adsorbent bed containing as an adsorbent particles comprised of crystallites of a zeolitic molecular sieve having pore diameters of at least 3.0 Angstroms and in which the said zeolite crystallites forming the outer shell of the adsorbent particles to a depth of not greater than about 0.1 millimeter into the particles, and constituting less than about 35 volume percent of said particles, contain ionic or elemental silver, the remainder of the overall adsorbent particles being essentially free of silver whereby mercury is adsorbed and a purified product stream is recovered as an effluent from the bed, (b) periodically regenerating said bed by the passage as a purge gas therethrough of a portion of the purified product in the vapor phase, and (c) condensing the effluent from the bed during regeneration and recovering the liquid phase mercury for the liquefied purge gas.

9. Process according to claim 8 wherein the bed regeneration is carried out by passing the purge gas stream through the bed in a direction counter-current to the direction of flow through the bed during the purification adsorption step.

10. Process according to claim 9 wherein the feedstock being purified is naphtha.

* * * * *